Patented Oct. 28, 1924.

1,513,115

UNITED STATES PATENT OFFICE.

LUCAS P. KYRIDES, OF NEW YORK, N. Y., ASSIGNOR TO PARKE, DAVIS & COMPANY, OF DETROIT, MICHIGAN, A CORPORATION OF MICHIGAN.

COMPOUND OF MERCURY AND PROCESS OF PRODUCING THE SAME.

No Drawing.   Application filed July 11, 1921. Serial No. 483,713.

*To all whom it may concern:*

Be it known that I, LUCAS P. KYRIDES, a citizen of the United States, and a resident of the city of New York, borough of Manhattan, in the county of New York and State of New York, have invented certain new and useful Compounds of Mercury and Processes of Producing the Same, said compounds being particularly useful for the treatment of syphilis.

My invention relates broadly and generally to the preparation of certain novel aromatic mercurial compounds containing two carboxyl groups. In proceeding according to the preferred method, these novel products, of which the following are examples— (*a*) mercury-salicyl-oxy-acetic acid, and its salts, such as salts of sodium, potassium, etc.; (*b*) mercury-hydroquinone-diacetic acid, and its salts, and (*c*) mercury-resorcine-diacetic acid, and its salts, are obtained respectively from aryl-oxy-fatty acids, namely, salicyl-oxy-acetic acid, hydroquinone-diacetic acid, and resorcine-diacetic acid.

As far as I am aware, I am the first to prepare mercurial derivatives of the aryl-oxy fatty acids mentioned containing two carboxyl groups, and have discovered that said derivatives have peculiar value therapeutically over mercury compounds commonly used in the practice of medicine.

I have discovered that the mercury compounds of the class mentioned differ from aromatic mercurial compounds already known, in that they may, by my invention, be converted into nearly neutral, or perfectly neutral di-alkali salts; for example, di-sodium salts, which are especially suitable for injection purposes, either intravenously or intramuscularly. I have further found that these compounds may be prepared in a high degree of purity by treating the aqueous solutions of the impure products with a very weak acid such as carbon dioxide, as the pure compounds are not precipitated by this treatment, whereas, the impurities are precipitated and may be eliminated by known methods, such as filtration, centrifuging, settling, etc. The impurities, such as di-mercury derivatives, are first precipitated out, so that after filtration the free anhydrides of the mercury-aryl-oxy fatty acids, constituting the material out of which the desired salts are obtained, can then be precipitated out by the use of stronger acids, such, for example, as acetic acid.

The di-alkali salts are freely soluble in water and can be used thereapeutically, therefore, in aqueous solution for injection purposes. It has been found by biological tests that the toxicity of the di-sodium salt of mercury-salicyl-oxy-acetic acid is a small fraction, say, approximately one-seventh that of mercuric chloride, weight for weight, which latter has previously been used for the same purpose. All these mercurial derivatives produced according to my invention split off their mercury upon boiling with concentrated acids, such as hydrochloric, liberating mercuric salts, i. e., mercuric chloride, when hydrochloric acid is employed. I give below specific examples in the preparation of these mercurial aryloxy derivatives constituting my invention:

*Example I.*—Preparation of the sodium salt of mercury-salicyl-oxy-acetic acid, represented by the following formula:

40 grams of mercuric acetate $(CH_3COO)_2Hg$, preferably in crystalline form, although it is not obligatory, and 40 grams of salicyl-oxy-acetic acid—

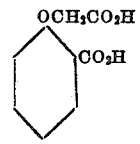

also preferably in crystalline form, and pure, are mixed by any suitable means and powdered together, it being desirable to powder these materials as finely as possible and to thoroughly mix the same. The finely powdered mixture is put into a suitable receptacle, for example, glass or enamel, and heated, preferably in an oil bath, or by other suitable means, such, for example, as superheated steam, the temperature of the heating medium being maintained at from approximately 140° to 160° C., the temperature within the limits mentioned being preferred in order to obtain the best results. The effect of the heat is to first form presumably the true mercury salt of salicyl-oxy-acetic acid.

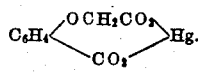

The acetic acid is driven off, and due to the maintenance of heat the mercury is gradually introduced in the benzene ring. This mixture is stirred continuously at the proper temperature until a sample dissolves in dilute alkali, producing either a clear solution, or a fine suspension of mercury, or its lower oxide, in the alkaline solution. The heating is maintained as long as mercuric oxide HgO separates out on treatment with dilute alkali as stated. I have found that the reaction carried on as described is usually completed in approximately one-half hour or less. The product produced by the reaction just described, namely, the impure mercury-salicyl-oxy-acetic anhydride, is dissolved in dilute alkali hydroxide, preferably sodium hydroxide, and is then treated with a current of carbon dioxide, or treated with a similar weak acid which precipitates out the impurities. This treatment is continued until precipitation ceases. The precipitate constitutes the undesirable impurities and is gelatinous in form. Upon the separation of the said impurities, preferably by filtration, the filtrate may then be tested further for impurities by further treatment with carbon dioxide gas. The filtrate contains the desired product, namely, di-sodium salt of mercury-salicyl-oxy-acetic acid. If clear, this solution containing the desired product is treated with an excess of an acid, stronger than said mercury aryl acid, such, for example, as acetic, whereupon the anhydride of mercury-salicyl-oxy-acetic acid is thrown out as a precipitate, which constitutes the base material from which the desired final product is to be obtained. This substance can be expressed by either of the two following formulas:—

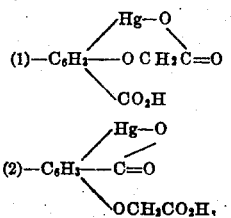

This precipitate is recovered, preferably by filtration, and is preferably washed with water to free it from acetic acid, and is then dissolved in a small volume of water by the gradual addition of a solution of sodium hydroxide or other suitable alkali, care being taken to avoid the addition of an appreciable excess of alkali. This is indicated by alkaline reaction to phenolphthalein when neutralization has been completed. A trace of alkali in excess is not objectionable, but in substantial excess should be avoided, otherwise there is danger of introducing objectionable products as impurities.

The solution obtained as just described is filtered, if necessary, and treated with alcohol (free from impurities and acetic acid) by pouring it into such solution while agitating, the alcohol being used in quantity two or three times by volume that of the solution, by which treatment the di-sodium salt of mercury-salicyl-oxy-acetic acid is separated out as a white granular precipitate, which is then recovered, preferably by filtration, and washed with a suitable quantity of pure alcohol, and then dried by any suitable means, for example, preferably in a vacuum oven at low temperature, preferably below 60° C., or in the air. This granular product, which according to analyses contains 43.5 to 43.9% mercury (theory= 43.85%), constitutes the purified desired material suitable for use for therapeutic purposes.

This substantially white dry powder has a very slight alkaline reaction as a rule to phenolphthalein, due to the slight excess of alkali which may have been used in the dissolving of the anhydride, but can be used as such therapeutically for injection purposes. The product described is preferably dissolved in pure distilled water.

The above process may be varied without departing from my invention, for example, the true mercury salt of salicyl-oxy-acetic acid can first be prepared, for example, by forming a water solution of salicyl-oxy-acetic acid, and treating it with a suitable mercury salt, such as mercuric acetate, whereby the said true mercury salt is thrown out of solution and may be recovered by known means. The isolated salt may be heated, either alone, or in mixture with some free salicyl-oxy-acetic acid, until a sample dissolves in dilute alkali without separating mercuric oxide, the same being the test above described. From this point the process may then be carried out as described above.

The method of isolation of the pure sodium salt may also be varied by merely evaporating the final aqueous solution, after treatment with carbon dioxide, to dryness in a vacuum at low temperatures, preferably below 60° C., instead of by the use of alcohol or other salting out solvents as above described. Also the unreacted salicyl-oxy-acetic acid can be recovered from the filtrates from the anhydride on treating this filtrate with an excess of concentrated hydrochloric acid or other strong acids, and the recovered product may be used for the preparation of succeeding batches of the mercurial derivatives.

*Example II.*—In like manner I may also prepare mercury compounds of the fatty acid substituted derivatives of di-hydroxybenzenes, such as hydroquinone, as follows:—

15 grams of hydroquinone-di-acetic acid—

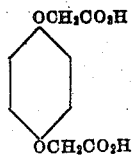

are changed into the mercuric salt—

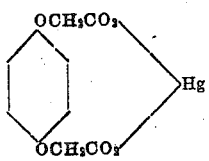

by ordinary methods, for example, by treating the same with water and a mercuric salt, such as mercuric acetate, according to a well-known reaction. The insoluble mercury salt of hydroquinone-di-acetic acid separates out and is recovered by filtering, whereupon, it is washed with water and dried by suitable means. The resulting dry powder is then heated in an oil bath, or by other suitable means, accompanied with agitation preferably, at a temperature of 130°–145° C., until the reaction is finished, as heretofore described in Example I, namely, until there is no separation of mercuric oxide on dissolving a test portion in dilute alkali. Further treatment in producing the desired product is similar and conforms to that described under Example I. The desired product is the di-sodium salt of mercury-hydroquinone-diacetic acid—

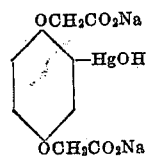

*Example III.*—Di-sodium salt of mercury resorcine-hydroquinone-diacetic acid.

In the preparation of this product the procedure is as follows:—Resorcine-diacetic acid—

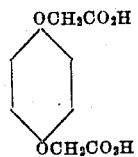

is dissolved in boiling water, and while stirring is treated with a little less than the theoretical amount of mercuric acetate and the stirring is continued for sometime. During the heating the mercury gradually enters the benzene ring. The white precipitate obtained is filtered and washed with water. The washed product is then treated with dilute alkali, such as sodium hydroxide, and filtered. The filtrate is subsequently treated with a current of carbon dioxide or treated with a similar weak acid until the precipitation of the impurities is complete, as described under Example I. When this point is attained the impurities are filtered and the clear filtrate, giving no more precipitate on further treatment with carbon dioxide, is treated with an excess of an acid, such as acetic, whereby the anhydride of mercury-resorcine-di-acetic acid precipitates out. The pure di-sodium salt of mercury-resorcine-diacetic acid is then obtained following the procedures described under Example I. The position of the mercury in the benzene ring in Examples I and III has not been as yet determined.

What I claim and desire to secure by Letters Patent of the United States is:—

1. The process which consists in causing a mercury compound to react with an aryl-oxy fatty acid containing two carboxyl groups to form a mercury compound of said acid in anhydride form in which the mercury has been introduced into the cyclic nucleus, treating said anhydride with an alkali and subsequently with a weak acid such as carbon dioxide to separate out impurities, separating said impurities from the solution, and treating the solution with acid to precipitate the anhydride of the mercury-aryl-oxy fatty acid containing two carboxyl groups.

2. The process which consists in causing a mercury compound to react with an aryl-oxy fatty acid containing two carboxyl groups to form a mercury compound of said acid in anhydride form in which the mercury has been introduced into the cyclic nucleus, treating said anhydride with an alkali and subsequently with a weak acid such as carbon dioxide to separate out impurities, separating said impurities from the solution, treating the solution with acid to precipitate the anhydride of the mercury-aryl-oxy fatty acid containing two carboxyl groups, washing the precipitate, and dissolving the same in an alkaline solution.

3. The process which consists in causing a mercury compound to react with an aryl-oxy fatty acid containing two carboxyl groups to form a mercury compound of said acid in anhydride form in which the mercury has been introduced into the cyclic nucleus, treating said anhydride with an alkali and subsequently with a weak acid such as carbon dioxide to separate out impurities, separating said impurities from the solution, treating the solution with acid to precipitate the anhydride of the mercury-aryl-oxy fatty acid containing two carboxyl groups, washing the precipitate, dissolving the same in an alkaline solution, and treating the solution with alcohol to separate out di-alkali salt of mercury-aryl-oxy fatty acid containing two carboxyl groups in which the H in each group is substituted by an alkali.

4. The process which consists in causing a mercury compound to react with an aryl-oxy fatty acid containing two carboxyl groups to form a mercury compound of said acid in anhydride form in which the mercury has been introduced into the cyclic nucleus, by mixing said compound and acid and heating the same accompanied by agitation until a sample treated with dilute alkali fails to show mercuric oxide, treating said anhydride with alkali and subsequently with a weak acid such as carbon dioxide to separate out impurities, separating the same from the solution, and treating the solution with acid to precipitate the anhydride of the mercury-aryl-oxy fatty acid containing two carboxyl groups.

5. The process which consists in causing a mercury compound to react with an aryl-oxy fatty acid containing two carboxyl groups to form a mercury compound of said acid in anhydride form in which the mercury has been introduced into the cyclic nucleus, by mixing said compound and acid and heating the same accompanied by agitation until a sample treated with dilute alkali fails to show mercuric oxide, treating said anhydride with alkali and subsequently with a weak acid such as carbon dioxide to separate out impurities, separating the same from the solution, treating the solution with acid to precipitate the anhydride of the mercury-aryl-oxy fatty acid containing two carboxyl groups, washing the precipitate and dissolving the same in an alkali solution, and treating the solution with alcohol to separate out di-alkali salt of mercury-aryl-oxy fatty acid containing two carboxyl groups in which the H in each group is substituted by an alkali.

6. The process which consists in causing a mercury compound to react with salicyl-oxy-acetic acid to form mercury-salicyl-oxy-acetic anhydride, treating said anhydride with alkali and subsequently with a weak acid such as carbon dioxide to separate out impurities, separating the same from the solution, and treating the solution with acid to precipitate the anhydride of mercury-salicyl-oxy-acetic acid.

7. The process which consists in causing a mercury compound to react with salicyl-oxy-acetic acid to form mercury-salicyl-oxy-acetic anhydride, treating said anhydride with alkali and subsequently with a weak acid such as carbon dioxide to separate out impurities, separating the same from the solution, treating the solution with acid to precipitate the anhydride of mercury-salicyl-oxy-acetic acid, and washing the precipitate and dissolving the same in alkali solution.

8. The process which consists in causing a mercury compound to react with salicyl-oxy-acetic acid to form mercury-salicyl-oxy-acetic anhydride, treating said anhydride with alkali and subsequently with a weak acid such as carbon dioxide to separate out impurities, separating the same from the solution, treating the solution with acid to precipitate the anhydride of mercury-salicyl-oxy-acetic acid, washing the precipitate and dissolving the same in alkali solution, and treating the solution with alcohol to separate out the di-alkali salt of mercury-salicyl-oxy-acetic acid.

9. As new substances, mercurial derivatives of aryl-oxy-fatty acids containing two carboxyl groups and no free phenolic group.

10. As new substances, mercurial derivatives of aryl-oxy-fatty acids containing two carboxyl groups in which the hydrogen in the carboxyl groups is substituted by an alkali and containing no free phenolic group.

11. As a new article of manufacture, a product which may be derived by treating an aryl-oxy-fatty acid with a mercuric compound in which treatment mercury is introduced in the cyclic nucleus, and which has the following characteristics: In its acid or anhydride form it is insoluble in water and readily soluble in caustic alkalies, and in the form of its alkali salt it is soluble in water, not precipitated from solution by carbon dioxide, is nearly neutral to phenolphthalein, and upon boiling with hydrochloric acid liberates mercury in the form of mercuric chloride.

12. As new products, the derivatives of mercury-salicyl-oxy-acetic acid, the di-metallic salts of said acid having the following formula:

$$C_6H_3{\Large\langle}{\!\!\!{\begin{array}{l}\text{HgOH}\\\text{OCH}_2\text{COOMe}\\\text{COOMe}\end{array}}}$$

where Me represents a monovalent metallic atom.

13. As a new article of manufacture, a di-alkali salt of a mercury-salicyl-oxy-fatty acid, the same having the formula—

$$C_6H_3{\Large\langle}{\!\!\!{\begin{array}{l}\text{HgOH}\\\text{ORCO}_2\text{X}\\\text{CO}_2\text{X}\end{array}}}$$

in which R designates an alkylene radical and X indicates an alkali metal.

14. As a new article of manufacture, a di-sodium salt of a mercury-salicyl-oxy-fatty acid, the same having the formula—

$$C_6H_3{\Large\langle}{\!\!\!{\begin{array}{l}\text{HgOH}\\\text{ORCO}_2\text{Na}\\\text{CO}_2\text{Na}\end{array}}}$$

in which R designates an alkylene radical.

15. As a new article of manufacture, a dialkali salt of mercury-salicyl-oxy-acetic acid, the same having the formula—

$$C_6H_3\!\!\begin{array}{l}-HgOH\\-OCH_2CO_2X\\-CO_2X\end{array}$$

in which X designates an alkali metal.

16. As a new article of manufacture, disodium salt of mercury-salicyl-oxy-acetic acid, the same having the formula—

$$C_6H_3\!\!\begin{array}{l}-HgOH\\-OCH_2CO_2Na\\-CO_2Na\end{array}$$

and being nearly neutral to phenolphthalein, soluble in water, and not precipitated from solution by carbon dioxide.

17. As new substances, mercurial derivatives of the aryl ethers of the fatty acids, which compounds contain two carboxyl groups.

18. As new substances, mercurial derivatives of the aryl ethers of the fatty acids, which compounds contain two carboxyl groups the hydrogen of which is displaced by an alkali.

In testimony whereof I have hereunto signed my name in the presence of two subscribing witnesses.

LUCAS P. KYRIDES.

Witnesses:
AGNES E. CUNNEEN,
E. G. HEYLMUR.